United States Patent
Cocchi et al.

(10) Patent No.: US 11,266,161 B2
(45) Date of Patent: Mar. 8, 2022

(54) MACHINE AND METHOD FOR MAKING CHOCOLATE

(71) Applicant: ALI GROUP S.r.l.—CARPIGIANI, Cemusco sul Naviglio (IT)

(72) Inventors: Andrea Cocchi, Calderara di Reno (IT); Roberto Lazzarini, Reggio Emilia (IT)

(73) Assignee: ALI S.P.A.—CARPIGIANI GROUP, Milan (IT)

(*) Notice: Subject to any disclaimer, the term of this patent is extended or adjusted under 35 U.S.C. 154(b) by 0 days.

(21) Appl. No.: 14/279,974

(22) Filed: May 16, 2014

(65) Prior Publication Data

US 2014/0348999 A1    Nov. 27, 2014

(30) Foreign Application Priority Data

May 24, 2013   (IT) .......................... BO2013A000259

(51) Int. Cl.
| | |
|---|---|
| *A23G 1/00* | (2006.01) |
| *A23G 1/18* | (2006.01) |
| *A23G 1/20* | (2006.01) |

(52) U.S. Cl.
CPC ........... *A23G 1/005* (2013.01); *A23G 1/0009* (2013.01); *A23G 1/0046* (2013.01); *A23G 1/18* (2013.01); *A23G 1/206* (2013.01)

(58) Field of Classification Search
CPC .... A01B 12/006; A23G 1/005; A23G 1/0009; A23G 1/0046; A23G 1/18; A23G 1/206
See application file for complete search history.

(56) References Cited

U.S. PATENT DOCUMENTS

| | | | | |
|---|---|---|---|---|
| 4,645,093 A | * | 2/1987 | Jones ........................ | A23G 9/28 141/104 |
| 4,859,483 A | * | 8/1989 | Sollich ...................... | A23G 1/04 426/519 |
| 5,447,371 A | * | 9/1995 | Agapiou ................. | A23G 9/045 366/290 |

FOREIGN PATENT DOCUMENTS

| | | | |
|---|---|---|---|
| EP | 379237 A1 * | 7/1990 | ............... A23G 1/04 |
| EP | 2524603 | 11/2012 | |

(Continued)

OTHER PUBLICATIONS https://expertenough.com/973/chocolate; Chocolate: a Complete Beginner's Guide; Georgette, Jayne: Dec. 28, 2011; pp. 1-21. Downloaded Jul. 12, 2019; (Year: 2011).*

(Continued)

*Primary Examiner* — Steven N Leff
(74) *Attorney, Agent, or Firm* — Shuttleworth & Ingersoll, PLC; Timothy Klima

(57) ABSTRACT

A machine for making and dispensing chocolate, comprising:
  at least one chocolate processing container;
  a chocolate dispenser tap connected to the processing container for allowing chocolate dispensing;
  at least a first mixer associated with the container for mixing the chocolate being processed;
  thermal treatment means associated with said at least one processing container and designed to heat and/or cool the walls of said processing container;
  an operating and control unit, designed to control said thermal treatment means so as to bring, in sequence in terms of time, the chocolate being processed in said at least one container;
  to a first, chocolate melting temperature;
  to a second temperature, which is lower than the first temperature;

(Continued)

to a third temperature, which is between the second temperature and the first temperature.

4 Claims, 2 Drawing Sheets

(56) References Cited

FOREIGN PATENT DOCUMENTS

| | | |
|---|---|---|
| EP | 2541165 | 1/2013 |
| GB | 1286486 | 8/1972 |

OTHER PUBLICATIONS https://www.chemistryviews.org/details/ezine/808827/Chocolate_The_Noblest_Polymorphism_II.html; Roth, Klaus; Sep. 13, 2010; p. 1-4; Downloaded Jul. 12, 2019. (Year: 2010).*

Italian Search Report dated Feb. 13, 2014 from counterpart app No. BO20130259.

* cited by examiner

MACHINE AND METHOD FOR MAKING CHOCOLATE

This application claims priority to Italian Patent Application BO2013A000259 filed May 24, 2013, the entirety of which is incorporated by reference herein.

BACKGROUND OF THE INVENTION

This invention relates to a machine and a method for instantaneously making and dispensing cake and pastry fillings, ice cream products and the like.

In this description reference will be made in particular, but without limiting the scope of the invention, to a machine for processing, producing and dispensing chocolate in a liquid state, and more specifically, to a machine capable of implementing a chocolate production process.

Known from the prior art in the sector in question are machines especially designed for making chocolate.

These machines, however, are designed specifically for the production of a chocolate product and cannot be used to make products other than chocolate.

In other words, chocolate making machines of known type are not versatile and do not allow making other types of products.

Moreover, a strongly felt need in the sector in question is that of being able to produce chocolate having a particularly high number of type V crystals, that is, chocolate of particularly high quality, even in organoleptic terms.

SUMMARY OF THE INVENTION

The aim of this invention is to provide a machine and a method which are alternative to the technical solutions hitherto known in the chocolate production sector.

Another aim of this invention is to provide a machine and a method for making chocolate which are particularly versatile.

Yet another aim of this invention is to provide a machine and a method for making chocolate of particularly high quality.

According to the invention, these aims are achieved by a machine and a method comprising the technical features described in one or more of the appended claims.

BRIEF DESCRIPTION OF THE DRAWINGS

The technical features of the invention, with reference to the above aims, are clearly described in the claims below and its advantages are more apparent from the detailed description which follows, with reference to the accompanying drawings which illustrate a preferred non-limiting example embodiment of the invention, and in which:

DESCRIPTION OF THE PREFERRED EMBODIMENTS

Figure 1:
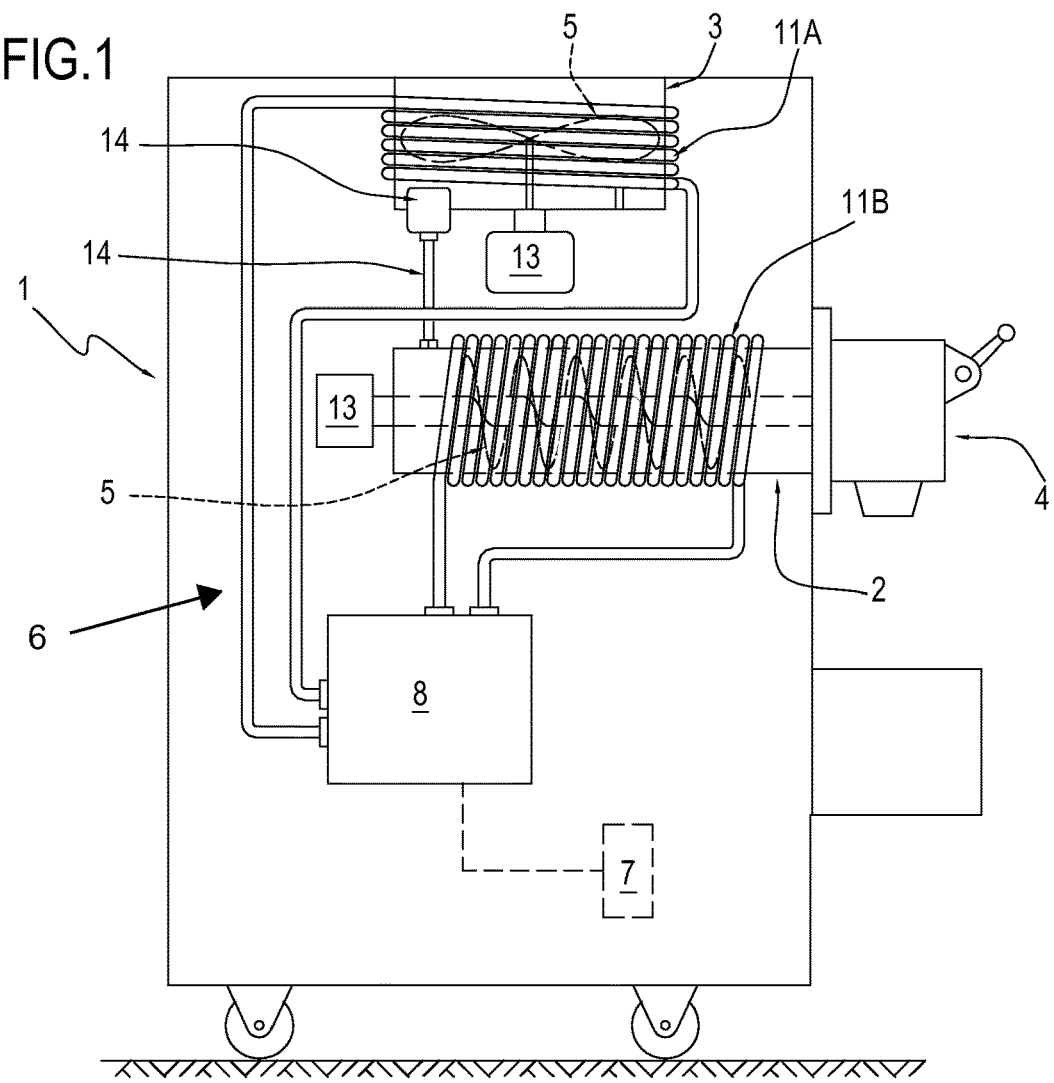
FIG. 1 is a schematic view of a preferred embodiment of the machine according to the invention.

With reference to the accompanying drawings, the reference numeral 1 denotes a machine for making chocolate (in a liquid state) according to this invention.

It should be noted that the machine 1 according to the invention allows the chocolate in a liquid state to be subjected to a tempering process.

The machine 1 for making and dispensing chocolate comprises:

- at least one chocolate processing container (2, 3);
- a dispenser tap 4 for dispensing the chocolate from the processing container (2, 3);
- at least a first mixer 5 associated with the container (2,3) for mixing the chocolate being processed;
- thermal treatment means 6 associated with the at least one processing container (2,3) for heating and/or cooling the walls of the processing container (2,3);
- an operating and control unit 7, designed to control the thermal treatment means 6 so as to bring, in sequence in terms of time, the chocolate being processed in the at least one container (2,3);
- to a first, chocolate melting temperature (T1);
- to a second temperature (T2), which is lower than the first temperature (T1);
- to a third temperature (T3), which is between the second temperature (T2) and the first temperature (T1).

It should be noted that according to the invention, the chocolate is not necessarily brought to the first temperature T1, to the second temperature T2 and to the third temperature 13 inside the same container (2,3): the chocolate may be brought to the three temperature in three different containers, as illustrated in FIG. 1.

It should also be noted that the thermal treatment means 6 associated with the at least one processing container (2,3) are designed to heat and/or cool the side walls of the processing container (2,3).

Advantageously, the side walls define a large heat exchange surface.

The mixer 5 is preferably made in the form of a spiral mixer.

Preferably, the mixer 5 is driven by a motor 13.

It should be noted that the purpose of the mixer is to homogenize the chocolate mass to give it a more uniform consistency.

The mixer also facilitates the feeding motion of the chocolate towards the dispenser tap 4.

FIG. 1 shows a machine 1 which can also make soft ice-cream.

Thus, in addition to chocolate, the machine 1 is capable of making ice cream of the type known as soft ice cream by suitably selecting the ingredients.

According to this aspect, the operating and control unit 7 can be configured, that is, programmed, by the user to drive the thermal treatment means 6 in such a way as to bring the product being processed (chocolate or soft ice cream) to one or more preset operating temperatures.

It should be noted that the operating configuration of the machine 1, or more specifically, the programming of the operating temperatures, when the machine 1 makes soft ice cream is different from that when chocolate is being made.

Hereinafter, the machine 1 is described with reference to the making and dispensing of chocolate.

With reference to the first temperature T1, it may be noted that the temperature T1 is between 40° C. and 50° C.

Preferably, the first temperature T1 is between 43° C. and 47° C.

Still more preferably, the first temperature T1 is substantially equal to 45° C.

With reference to the second temperature T2, it may be noted that the second temperature T2 is between 25° C. and 35° C.

Preferably, the second temperature T2 is between 25° C. and 30° C.

Still more preferably, the second temperature T2 is substantially equal to 29° C.

With reference to the third temperature T3, it may be noted that the third temperature T3 is between 25° C. and 38° C.

Preferably, the third temperature T3 is between 30° C. and 35° C.

Still more preferably, the third temperature T3 is substantially equal to 31° C.

It should be noted that the thermal treatment means 6 preferably comprise a plant 8 designed to make an operating fluid circulate in a closed circuit in such a way as to operate according to a thermodynamic cycle.

The plant 8 preferably comprises a compressor and at least one exchanger.

More specifically, the thermal treatment means 6 preferably comprise a heat exchanger (forming part of the plant 8) associated with the container (2,3) in order to heat it.

In the embodiment illustrated in FIG. 1, the plant 8 comprises a first heat exchanger 11A and a second heat exchanger 11B.

More specifically, the heat exchanger is associated with the walls of the container (2,3) so as to exchange heat therewith and, consequently, with the chocolate product inside.

In the example illustrated in FIG. 1, the processing container comprises a processing cylinder 2 which can be opened and closed sealedly from the outside.

In this regard, it should be noted that the processing cylinder 2 is equipped with a door giving access to the compartment inside.

In this sense, the access door is opened/closed to gain access to the compartment inside.

The processing cylinder 2 comprises a heat exchanger 11B associated therewith (forming part of the thermal treatment means).

Preferably, also, the thermal treatment means 6 may comprise one or more electrical resistance elements associated with the processing cylinder 2 in order to heat the walls thereof.

With regard to the example illustrated in FIG. 1, it should be noted that the machine 1 further comprises a collection tank 3 for the chocolate to be processed, connected to the processing cylinder 2 for allowing transferring the chocolate to be processed from the tank 3 to the cylinder 2.

Preferably, the machine 1 comprises transfer means 14 for transferring the chocolate from the tank 3 to the processing cylinder 2.

It should be noted that the transfer means 14 preferably comprise a duct and a pump for transferring the product from the tank 3 to the processing cylinder 2.

In this regard, it should be noted that the thermal treatment means 6 are associated with the cylinder 2 and the tank 3 in such a way as to heat the chocolate being processed to the first temperature T1 inside the collection tank 3 and to bring the chocolate being processed to the second temperature T2 and to the third temperature T3 inside the processing cylinder 2.

The thermal treatment means 6 may also comprise a single thermal treatment plant 8 associated with both the tank 3 and with the cylinder 2 or they may comprise a thermal treatment plant associated with the tank 3 to thermally treat the product inside the tank 3 and a second thermal treatment plant (distinct from the first) associated with the cylinder 2 to thermally treat the product inside the cylinder 2.

In other words, in more general terms, in one embodiment, the thermal treatment means 6 comprise first and second thermal treatment means which are associated with the tank 3 and with the cylinder 2, respectively, and which are distinct and separate from each other.

Figure 4:
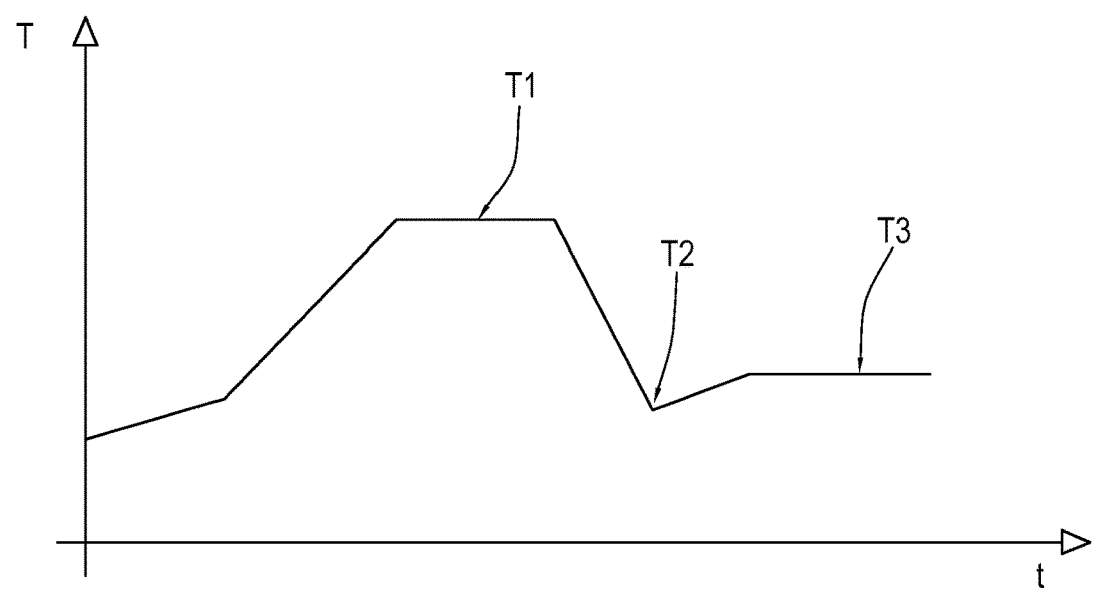
FIG. 4 schematically shows a time-temperature graph of the chocolate production method according to the invention.

In this regard, a brief description follows of the method for making chocolate in the machine illustrated in FIG. 1, with reference in particular to FIG. 4. which illustrates a chocolate production cycle.

FIG. 4 shows a graph of temperature (T) over time (t) of a chocolate production cycle implemented in the machine 1, that is, according to the invention.

The chocolate is placed inside the tank 3 to be brought to the first temperature T1.

Preferably, the chocolate is heated to the first temperature T1.

Preferably the chocolate is kept at the temperature T1 for a predetermined length of time.

Preferably, the predetermined length of time is less than 7 minutes.

The purpose of heating the chocolate to the first temperature T1 is to bring the chocolate to a liquid state.

After keeping the chocolate at the first temperature T1, it is transferred from the tank 3 to the processing cylinder 2.

Inside the processing cylinder 2, the chocolate is brought to the second temperature T2.

Figure 3:
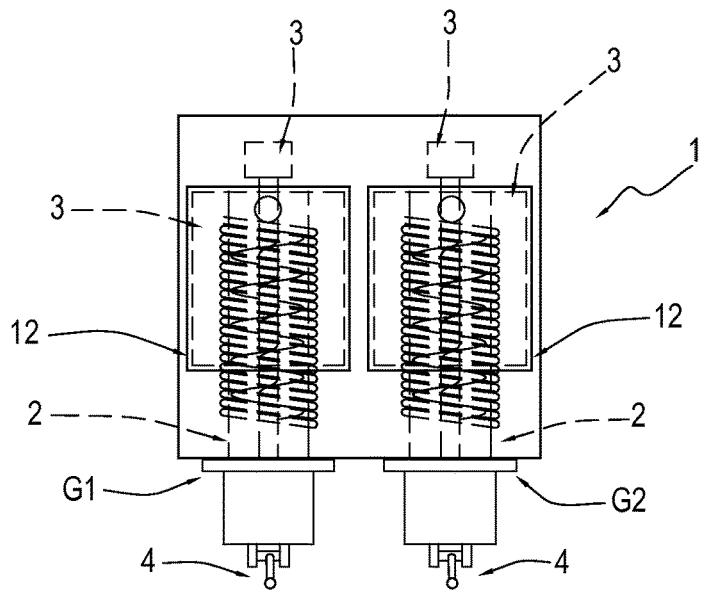
FIG. 3 is a schematic plan view of another embodiment of the machine according to the invention.

According to the graph shown in FIG. 3, the chocolate is cooled from the first temperature T1 to the second temperature T2.

Cooling from the first temperature T1 to the second temperature T2 is effected rapidly in order to reduce the number of type VI crystals present in the product.

After reaching the second temperature, the product is brought to the third temperature T3 by heating.

It should be noted that the purpose of heating to the third temperature T3 is to promote the formation of stable type V crystals in the product.

Preferably, the product is kept at the third temperature T3 for a predetermined length of time before taking it out.

It should be noted that according to the above, the method comprises an initial step of batch processing the product, where the product is brought to the first temperature T1, to the second temperature T2 and to the third temperature T3, and a subsequent step of transferring the product from the tank 3 to the cylinder 2, which might also be performed continuously.

It should be noted that the machine 1 is advantageously capable allowing chocolate of particularly high quality to be made.

In effect, the machine allows controlling in a particularly effective manner the "crystallization" of the chocolate, so that the chocolate has a very high number of stable type V crystals on it.

Figure 2:
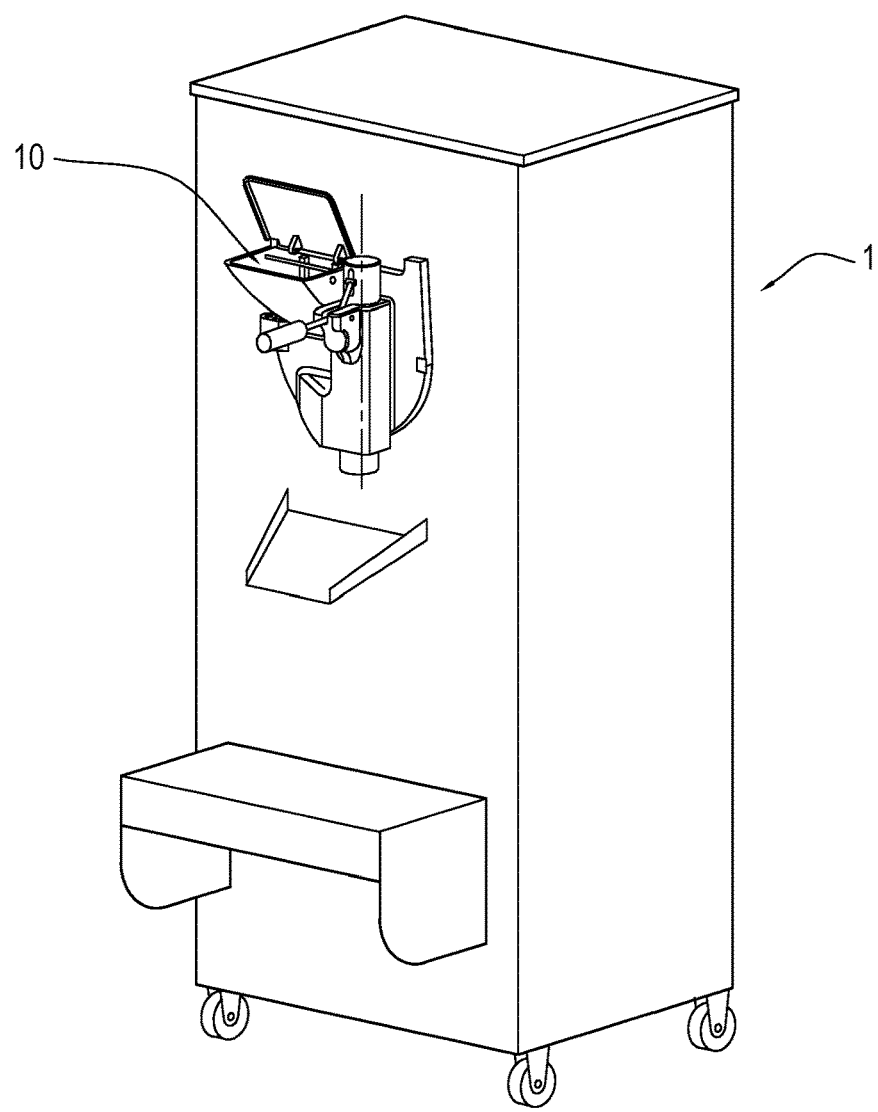
FIG. 2 is a schematic view of another embodiment of the machine according to the invention.

FIG. 2 illustrates another embodiment of the invention, where the machine 1 comprises a cylinder 2 for processing the product (mounted inside the frame and therefore not visible in the drawing).

In this embodiment, the tank 3 is not provided.

It should be noted that in this embodiment of the machine, the product constituting the chocolate is fed into the processing cylinder 2 through a feed cup 10.

It should be noted that the machine 1 of FIG. 2 is a mixing and freezing unit capable of also making artisan gelato.

Thus, the machine 1 shown in FIGS. 1 and 2 can make both ice cream/gelato and hot chocolate by suitably adjusting the configuration/programming of the machine 1 itself.

In this regard, the thermal treatment means 6 may comprise one or more resistance elements which heat the cylinder 2 in such a way as to subject the hot chocolate to the three temperatures, namely, the first temperature T1, the second temperature T2, and the third temperature T3.

Preferably, the thermal treatment means 6 are configured to heat the side walls of the cylinder 2.

It should be noted that the machine 1 preferably comprises one or more temperature sensors operatively associated with the container 2,3 to provide a temperature signal.

Further, still more preferably, the control unit 7 is operatively connected to the one or more sensors to adjust the thermal treatment means 6 during the operating cycle, based on the signal from the one or more sensors so that the temperature of the product inside the container is substantially equal to the programmed temperature (first, second and third temperature).

In another embodiment, illustrated schematically in FIG. 3, the machine 1 comprises a first treatment unit G1 provided with at least a first container (2,3), for making chocolate of a first type, and a second treatment unit G2 provided with at least a second container (2,3), for making chocolate of a second type.

In the particular embodiment illustrated in FIG. 3, it should be noted that each treatment unit (G1,G2) comprises a tank 3 and a processing cylinder 2, having the same features and functions as those described with reference to FIG. 1.

It should be noted that in this embodiment of the machine, the operating cycle described above with reference to FIG. 1 is carried out in each treatment unit G1,G2.

It should be noted that the two treatment units (G1,G2) can operate independently and separately from each other, meaning that either only one of the two treatment units (G1,G2) can work or both of the treatment units (G1,G2) can work simultaneously.

In FIG. 3, the machine 1 is shown in a plan view and both the tanks 3 and the cylinders 2 are drawn with dashed lines because they are mounted inside the frame: in particular the tank 3 can be closed by means of a cover 12.

Advantageously this embodiment of the machine 1 allows simultaneously making chocolate of a first type in the first container and chocolate of a second type in the second container.

It should be noted, therefore, that this embodiment of the machine is a double Machine.

Also defined is a method for making chocolate, comprising the following steps:

placing a basic product designed to form chocolate inside at least one processing container (2, 3);

subjecting said basic product to thermal treatment and mixing in the processing container (2, 3), said thermal treatment comprising the following sequence of operations:

heating the basic product to a first, chocolate melting temperature (T1);

cooling the basic product to a second temperature (T2), which is lower than the first temperature (T1);

heating the basic product to a third temperature (T3), which is between the second temperature (T2) and the first temperature (T1).

The thermal treatment step is carried out, according to the invention, by cooling/heating the walls of the container (2, 3).

Thus, the thermal treatment step is carried out when the chocolate is inside the container (2,3).

In one embodiment, at least the operations of cooling the basic product to a second temperature T2 and of heating the basic product to a third temperature T3 are carried out in the same processing cylinder 2 which can be isolated (is isolated in use) sealedly from the outside environment.

Accordingly, to another aspect, even the operation of heating the basic product to a first, chocolate melting temperature T1 is carried out in the processing cylinder 2.

According to yet another aspect, at least the operations of heating the basic product to a second temperature T2 and to a third temperature T3 comprise a heat exchange with a thermal treatment plant 8 operating according to a thermodynamic cycle through a wall of the container (2,3), preferably through the side walls thereof.

According to a further aspect, the operation of heating the basic product to a first, chocolate melting temperature T1 comprises a heat exchange with a thermal treatment plant 8 operating according to a thermodynamic cycle, through a wall of the container (2,3).

In one embodiment, the operation of heating the basic product to a first chocolate melting temperature T1 is carried out in a tank 3 and the operations of heating the basic product to a second temperature T2 and of heating the basic product to a third temperature T3 are carried out in a processing cylinder 2 which is connected to the tank 3 and which can be isolated his isolated in use) sealedly from the outside environment.

It should be noted that this advantageously allows improving product storage conditions so that the product made keeps for a longer length of time while maintaining its high quality.

It has also been found experimentally that the absence of air from the outside during thermal treatment makes it possible to improve the organoleptic quality of the end product obtained.

With reference to the advantages of the invention, it should be noted that the machine 1 and the method provided are particularly simple and allow making chocolate of very high quality characterized by the presence of a particularly high number of type V crystals.

What is claimed is:

1. A method for making chocolate, comprising:
   providing a chocolate processing machine including at least one processing container;
   placing a basic product for forming chocolate inside the at least one processing container;
   subjecting the basic product to thermal treatment and mixing in the processing container, the thermal treatment comprising, in sequence:
   heating the basic product to a first, chocolate melting temperature;
   cooling the basic product to a second temperature, which is lower than the first temperature;
   heating the basic product to a third temperature, which is between the second temperature and the first temperature,
   conducting the thermal treatment by adjusting a temperature of at least one wall of the at least one processing container, wherein the at least one processing container includes a collection tank including a first temperature adjustable wall and a separate processing cylinder connected downstream of the collection tank to receive the basic product from the collection tank,
   providing that the processing cylinder includes an interior processing chamber for processing the basic product and a second temperature adjustable wall surrounding the interior processing chamber, wherein the second temperature adjustable wall is separate and distinct from the first temperature adjustable wall,
wherein the conducting the thermal treatment includes providing a single thermal treatment plant operating according to a thermodynamic cycle and controlling the single thermal treatment plant to adjust temperatures of the first temperature adjustable wall and the second temperature adjustable wall separately and independently from one another;
wherein the chocolate processing machine and the processing cylinder are surrounded by an ambient environment;
providing a mixer positioned in the interior processing chamber of the processing cylinder for mixing the basic product in the interior processing chamber;
placing the basic product into the collection tank and heating the basic product to the first, chocolate melting temperature in the collection tank;
after the basic product is heated to the first, chocolate melting temperature, transferring all of the basic product contained in the collection tank to the interior processing chamber;
cooling the basic product from the first, chocolate melting temperature to the second temperature in the interior processing chamber to reduce a quantity of type VI crystals present in the basic product by adjusting a temperature of the temperature adjustable wall;
upon the basic product being cooled to the second temperature, heating the basic product to the third temperature in the interior processing chamber to promote formation of type V crystals in such a manner that the type V crystals are stable in the basic product by adjusting the temperature of the temperature adjustable wall;
wherein the first temperature is between 43° C. and 47° C.;
wherein the second temperature is 29° C.;
wherein the third temperature is 31° C.;
providing:
  a transfer system connected between the collection tank and the interior processing chamber for transferring the basic product from the collection tank to the interior processing chamber, the transfer system including a duct and a pump for pumping the basic product from the collection tank to the interior processing chamber;
  a dispenser tap connected to the interior processing chamber for dispensing the chocolate from the interior processing chamber to the ambient environment;
after transferring all of the basic product contained in the collection tank to the interior processing chamber, isolating the basic product in the interior processing chamber from:
  1) the collection tank by providing that the pump is not pumping, and
  2) air in the ambient environment outside the interior processing chamber by sealing the interior processing chamber from the ambient environment by the providing that the pump is not pumping and by providing that the dispenser tap is closed;
cooling the basic product to the second temperature and heating the basic product to the third temperature while the basic product is isolated hi the interior processing chamber from the collection tank and from the air in the ambient environment outside the interior processing chamber;
after the basic product has been heated to the first, chocolate melting temperature, keeping the basic product at the first, chocolate melting temperature for a time greater than 0 minutes and less than 7 minutes;
providing a first sensor in the collection tank and a second sensor in the interior processing chamber to determine the respective temperatures of the discrete batch of the basic product in the collection tank and the interior processing chamber and using signals from the first and second sensors to control the single thermal treatment plant, operation of the first temperature adjustable wall, and operation of the second temperature adjustable wall, to obtain the first temperature, the second temperature and the third temperature;
providing that the machine is adjustable between a configuration for making chocolate and a configuration for making ice cream;
adjusting the machine to the configuration for making chocolate;
providing an electrical resistance heating element operatively connected to a side wall of the processing cylinder;
activating the electrical resistance element to provide further heat to the interior processing chamber during the heating the basic product to the third temperature.

2. A machine for making and dispensing chocolate, comprising:
at least one chocolate processing container;
a chocolate dispenser tap connected to the processing container for allowing chocolate dispensing;
at least a first mixer positioned in with the at least one chocolate processing container for mixing a chocolate being processed;
a thermal treatment system operatively connected with the at least one chocolate processing container configured for at least one chosen from heating and cooling a wall of the at least one chocolate processing container; an operating and control unit, configured and programmed for controlling the thermal treatment system to bring, in sequence, the chocolate in the at least one chocolate processing container:
to a first, chocolate melting temperature;
to a second temperature, which is lower than the first temperature;
to a third temperature, which is between the second temperature and the first temperature;
the at least one chocolate processing container comprising:
  a collection tank for the chocolate;
  a separate processing cylinder;
  wherein the processing cylinder includes an interior processing chamber for receiving and processing the basic product and a temperature adjustable wall surrounding the interior processing chamber;
  a transfer system connected between the collection tank and the interior processing chamber for transferring for transferring the chocolate from the collection tank to the interior processing chamber, the interior processing chamber connected downstream of the collection tank by the transfer system to receive the basic product from the collection tank, the transfer system including a duct and a pump for pumping the basic product from the collection tank to the interior processing chamber;

wherein the mixer is positioned in the interior processing chamber for mixing the basic product in the interior processing chamber;
wherein the machine and the processing cylinder are surrounded by an ambient environment;
a dispenser tap connected to the interior processing chamber for dispensing the chocolate from the interior processing chamber to the ambient environment;
wherein the thermal treatment system is operatively connected with the collection tank for adjusting a temperature of the collection tank and with the temperature adjustable wall of the processing cylinder for adjusting a temperature of the temperature adjustable wall of the processing cylinder; the operating and control unit configured and programmed for controlling the thermal treatment system and the transfer system for:
heating the chocolate to the first, chocolate melting temperature in the collection tank by heating the collection tank;
after the chocolate is heated to the first, chocolate melting temperature, transferring all of the chocolate contained in the collection tank to the interior processing chamber;
cooling the chocolate from the first, chocolate melting temperature to the second temperature in the interior processing chamber to reduce a quantity of type VI crystals present in the chocolate by adjusting the temperature of the temperature adjustable wall of the processing cylinder;
heating the chocolate to the third temperature in the interior processing chamber to promote formation of type V crystals in such a manner that the type V crystals are stable in the chocolate by adjusting the temperature of the temperature adjustable wall of the processing cylinder;
wherein the first temperature is between 43° C. and 47° C.;
wherein the second temperature is 29° C.;
wherein the third temperature is 31° C.;
after the basic product has been heated to the first, chocolate melting temperature, keeping the chocolate at the first, chocolate melting temperature for a time greater than 0 minutes and less than 7 minutes;
after transferring all of the basic product contained in the collection tank to the interior processing chamber, isolating the basic product in the interior processing chamber from:
1) the collection tank by providing that the pump is not pumping, and
2) air in the ambient environment outside the interior processing chamber by sealing the interior processing chamber from the ambient environment by the providing that the pump is not pumping and by providing that the dispenser tap is closed;
cooling the basic product to the second temperature and heating the basic product to the third temperature while the basic product is isolated in the interior processing chamber from the collection tank and from the air in the ambient environment outside the interior processing chamber;
wherein the thermal treatment system comprises:
a single thermal treatment plant configured for circulating an operating fluid in a closed circuit according to a thermodynamic cycle;
a first heat exchanger operatively connected with the collection tank for heating the chocolate to the first, chocolate melting temperature in the collection tank;
a second heat exchanger operatively connected with the interior processing chamber for cooling the chocolate to the second temperature and heating the chocolate to the third temperature in the interior processing chamber;
a first sensor positioned in the collection tank and a second sensor positioned in the interior processing chamber to determine the respective temperatures of the discrete batch of the basic product in the collection tank and the interior processing chamber;
wherein the machine includes a configuration for making chocolate and a configuration for making ice cream and is adjustable between the configuration for making chocolate and the configuration for making ice cream;
an electrical resistance heating element operatively connected to a side wall of the processing cylinder;
the operating and control unit also configured and programmed for controlling the thermal treatment system for:
controlling the single thermal treatment plant to adjust temperatures of the first heat exchanger and the second heat exchanger separately and independently from one another;
using signals from the first and second sensors to control the single thermal treatment plant, operation of the first heat exchanger, and operation of the second heat exchanger, to obtain the first temperature, the second temperature and the third temperature;
in the configuration for making chocolate, activating the electrical resistance element to provide further heat to the interior processing chamber during the heating the basic product to the third temperature.
3. The machine according to claim 2, wherein the at least one chocolate processing container comprises a first treatment unit including the collection tank and the processing cylinder, for processing a first chocolate, and a second treatment unit including at least a second processing cylinder, for processing a second chocolate different from the first chocolate based on the same, wherein both the first processing cylinder and the second processing cylinder are connected to the collection tank in a same manner for receiving the chocolate directly from the collection tank for processing into the first chocolate and the second chocolate respectively.
4. A method for making chocolate, comprising:
providing a chocolate processing machine including at least one processing container;
placing a basic product for forming chocolate inside the at least one processing container;
subjecting the basic product to thermal treatment and mixing in the processing container, the thermal treatment comprising, in sequence:
heating the basic product to a first, chocolate melting temperature;
cooling the basic product to a second temperature, which is lower than the first temperature;
heating the basic product to a third temperature, which is between the second temperature and the first temperature,
conducting the thermal treatment by adjusting a temperature of at least one wall of the at least one processing container, wherein the at least one processing container includes a collection tank including a first temperature adjustable wall and a separate processing cylinder connected downstream of the collection tank to receive the basic product from the collection tank, providing that the processing cylinder includes an interior processing chamber for processing the basic product and a second temperature adjustable wall surrounding the interior processing chamber, wherein the second temperature adjustable wall is separate and distinct from the first temperature adjustable wall, wherein the conducting the thermal treatment includes providing a single thermal treatment plant operating according to a thermodynamic cycle and controlling the single thermal treatment plant to adjust temperatures of the first temperature adjustable wall and the second temperature adjustable wall separately and independently from one another;

wherein the chocolate processing machine and the processing cylinder are surrounded by an ambient environment;

providing a mixer positioned in the interior processing chamber of the processing cylinder for mixing the basic product in the interior processing chamber;

placing the basic product into the interior processing chamber and heating the basic product to the first temperature in the interior processing chamber;

cooling the basic product from the first, chocolate melting temperature to the second temperature in the interior processing chamber to reduce a quantity of type VI crystals present in the basic product by adjusting a temperature of the temperature adjustable wall;

upon the basic product being cooled to the second temperature, heating the basic product to the third temperature in the interior processing chamber to promote formation of type V crystals in such a manner that the type V crystals are stable in the basic product by adjusting the temperature of the temperature adjustable wall;

wherein the first temperature is between 43° C. and 47° C.;

wherein the second temperature is 29° C.;

wherein the third temperature is 31° C.;

providing:
- a transfer system connected between the collection tank and the interior processing chamber for transferring the basic product from the collection tank to the interior processing chamber, the transfer system including a duct and a pump for pumping the basic product from the collection tank to the interior processing chamber;
- a dispenser tap connected to the interior processing chamber for dispensing the chocolate from the interior processing chamber to the ambient environment;

after transferring all of the basic product contained in the collection tank to the interior processing chamber, isolating the basic product in the interior processing chamber from:
1) the collection tank by providing that the pump is not pumping, and
2) air in the ambient environment outside the interior processing chamber by sealing the interior processing chamber from the ambient environment by the providing that the pump is not pumping and by providing that the dispenser tap is closed;

cooling the basic product to the second temperature and heating the basic product to the third temperature while the basic product is isolated in the interior processing chamber from the collection tank and from the air in the ambient environment outside the interior processing chamber;

after the basic product has been heated to the first, chocolate melting temperature, keeping the basic product at the first, chocolate melting temperature for a time greater than 0 minutes and less than 7 minutes;

providing a first sensor in the collection tank and a second sensor in the interior processing chamber to determine the respective temperatures of the discrete batch of the basic product in the collection tank and the interior processing chamber and using signals from the first and second sensors to control the single thermal treatment plant, operation of the first temperature adjustable wall, and operation of the second temperature adjustable wall, to obtain the first temperature, the second temperature and the third temperature;

providing that the machine is adjustable between a configuration for making chocolate and a configuration for making ice cream;

adjusting the machine to the configuration for making chocolate;

providing an electrical resistance heating element operatively connected to a side wall of the processing cylinder;

activating the electrical resistance element to provide further heat to the interior processing chamber during the heating the basic product to the third temperature.

* * * * *